United States Patent
Kruse

(10) Patent No.: US 7,343,705 B2
(45) Date of Patent: Mar. 18, 2008

(54) MOTORCYCLE-HIDDEN FASTENER COVER SYSTEM

(76) Inventor: Timothy G. Kruse, 19736 Galena La., Mankato, MN (US) 56001

( * ) Notice: Subject to any disclaimer, the term of this patent is extended or adjusted under 35 U.S.C. 154(b) by 568 days.

(21) Appl. No.: 11/046,447

(22) Filed: Jan. 28, 2005

(65) Prior Publication Data

US 2005/0167176 A1    Aug. 4, 2005

Related U.S. Application Data

(60) Provisional application No. 60/540,209, filed on Jan. 29, 2004.

(51) Int. Cl.
*G09F 17/00* (2006.01)
(52) U.S. Cl. ...................... 40/590; 123/198 E
(58) Field of Classification Search ................. 40/590; 123/198 E; 180/219
See application file for complete search history.

(56) References Cited

U.S. PATENT DOCUMENTS

| 4,480,609 | A | * | 11/1984 | Hayashi | 123/195 C |
|---|---|---|---|---|---|
| 4,718,828 | A | * | 1/1988 | Breeck et al. | 417/313 |
| 5,285,754 | A | * | 2/1994 | Bell | 123/90.38 |
| 5,365,901 | A | * | 11/1994 | Kiczek | 123/195 C |
| 6,474,290 | B1 | * | 11/2002 | Coffey et al. | 123/198 E |
| 6,941,920 | B1 | * | 9/2005 | Thurm et al. | 123/195 C |
| D538,299 | S | * | 3/2007 | Morse | D15/5 |

\* cited by examiner

*Primary Examiner*—Lesley D. Morris
*Assistant Examiner*—Shin Kim
(74) *Attorney, Agent, or Firm*—Faegre & Benson LLP

(57) ABSTRACT

A motorcycle engine cover system includes a backing plate, a cover, and a fastener. The backing plate has at least one aperture for fastening the backing plate to a motorcycle engine and a protrusion including an aperture to accept the fastener. The cover has a mating aperture that is shaped to mate with the protrusion and a fastening aperture extending from a side surface into the mating aperture. The fastener extends through the fastening aperture of the cover and into the at least one aperture of the backing plate for attaching the cover to the backing plate.

19 Claims, 3 Drawing Sheets

MOTORCYCLE-HIDDEN FASTENER COVER SYSTEM

CROSS-REFERENCE TO RELATED APPLICATION(S)

This application claims the benefit of U.S. provisional application 60/540,209 filed Jan. 29, 2004, which is hereby incorporated by reference in its entirety.

TECHNICAL FIELD

This invention relates generally to motorcycle engine cover systems. More particularly, it relates to motorcycle engine covers that have hidden mounting fasteners.

BACKGROUND

Motorcycle engines include covers to cover openings holding internal components. Examples of these include ignition timing covers to protect ignition components from the environment and clutch hub or derby covers to cover the clutch inspection opening in the primary outer chain case. Motorcycle enthusiasts frequently replace original equipment motorcycle ignition timing covers with aftermarket covers that they find more aesthetically appealing. However, aftermarket timing covers frequently have visible fasteners that detract from the aesthetic appearance of the aftermarket cover. Exemplary motorcycle engines that includes such ignition timing covers are the Harley-Davidson® Twin Cam and Evolution® engines. Custom motorcycle builders will often replace stock covers with more appealing dress-up covers. Also, manufacturers may include more appealing dress-up covers as a stock component on certain models.

Therefore, there is a need in the art for a motorcycle engine opening cover that does not have visible mounting fasteners.

SUMMARY

The present invention, according to one embodiment, is a motorcycle engine cover system. The system includes a backing plate adapted for coupling to a motorcycle engine, the backing plate having a protrusion defining a first aperture to accept a fastener. The system further includes a cover defining a cavity that is shaped to mate with the protrusion and a second aperture extending from a side surface into the cavity. At least one fastener extends through the second aperture and into the first aperture for securing the cover to the backing plate. According to one embodiment, the engine cover system is adapted to cover an ignition timing opening. In another embodiment, the engine cover system is adapted to cover a clutch inspection opening in a primary outer chain case.

This summary is not intended to describe each embodiment or every implementation of the present invention. Advantages and a more complete understanding of the invention will become apparent upon review of the detailed description and claims in conjunction with the accompanying drawings.

Figure 1:
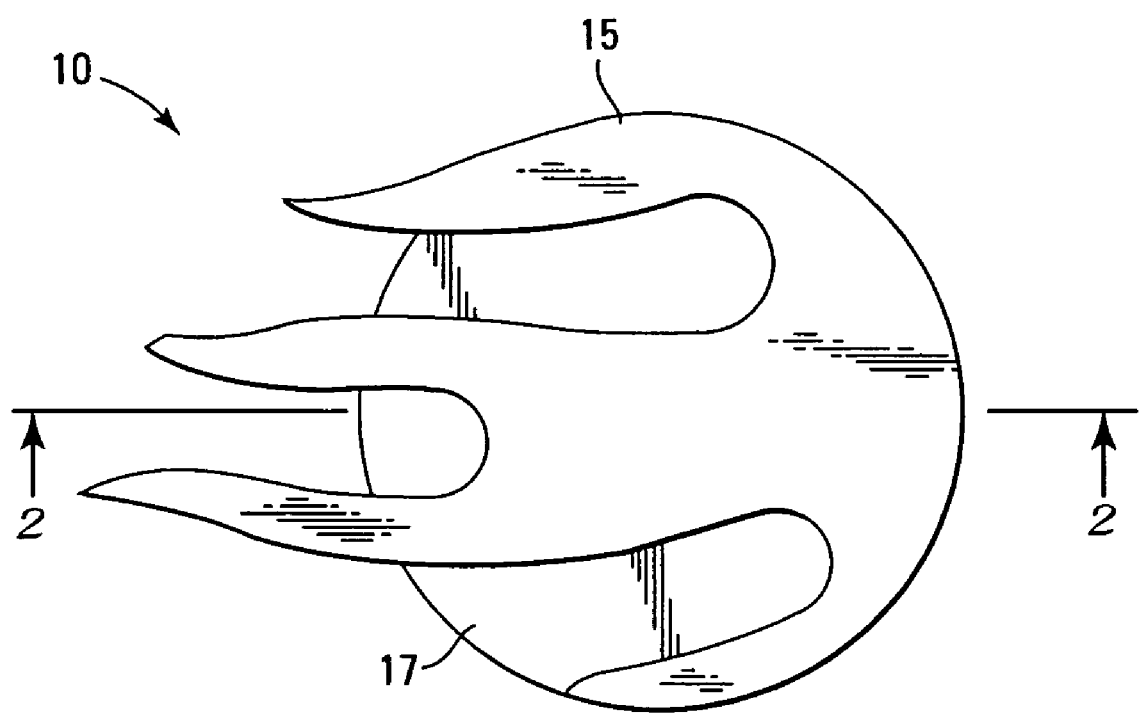
FIG. 1 is a top view of the cover and backing plate in accordance with the present invention.

While the invention is amenable to various modifications and alternative forms, specific embodiments have been show by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a top view of the cover 10 in accordance with the present invention. As shown in FIG. 1, the cover 10 has a design or pattern 15 covering a base 17. As shown, neither fasteners or mounting holes are visible from the top view of ignition timing assembly 10. In exemplary embodiments, the cover 10 is an ignition timing cover or a derby (i.e., clutch hub) cover.

While the pattern 15 is shown in the shape of a flame pattern, any other shape, design or pattern could be used. As shown in FIG. 1, the design or pattern 15 extends outward from the standard round diameter of the base 17, with no bolts showing. In other embodiments, the pattern does not extend outward beyond the diameter of the base 17. In one embodiment, the pattern 15 is raised with respect to the base 17. For example, the pattern 15 may extend upward from between about 0.01 to about 0.5 inches from a top surface of the base 17. In one exemplary embodiment, the base 17 has a diameter of between about 1 and about 10 inches. In one embodiment, the base 17 has a diameter of about 3 inches. In another embodiment, the base 17 has a diameter of about 8 inches.

Figure 2:
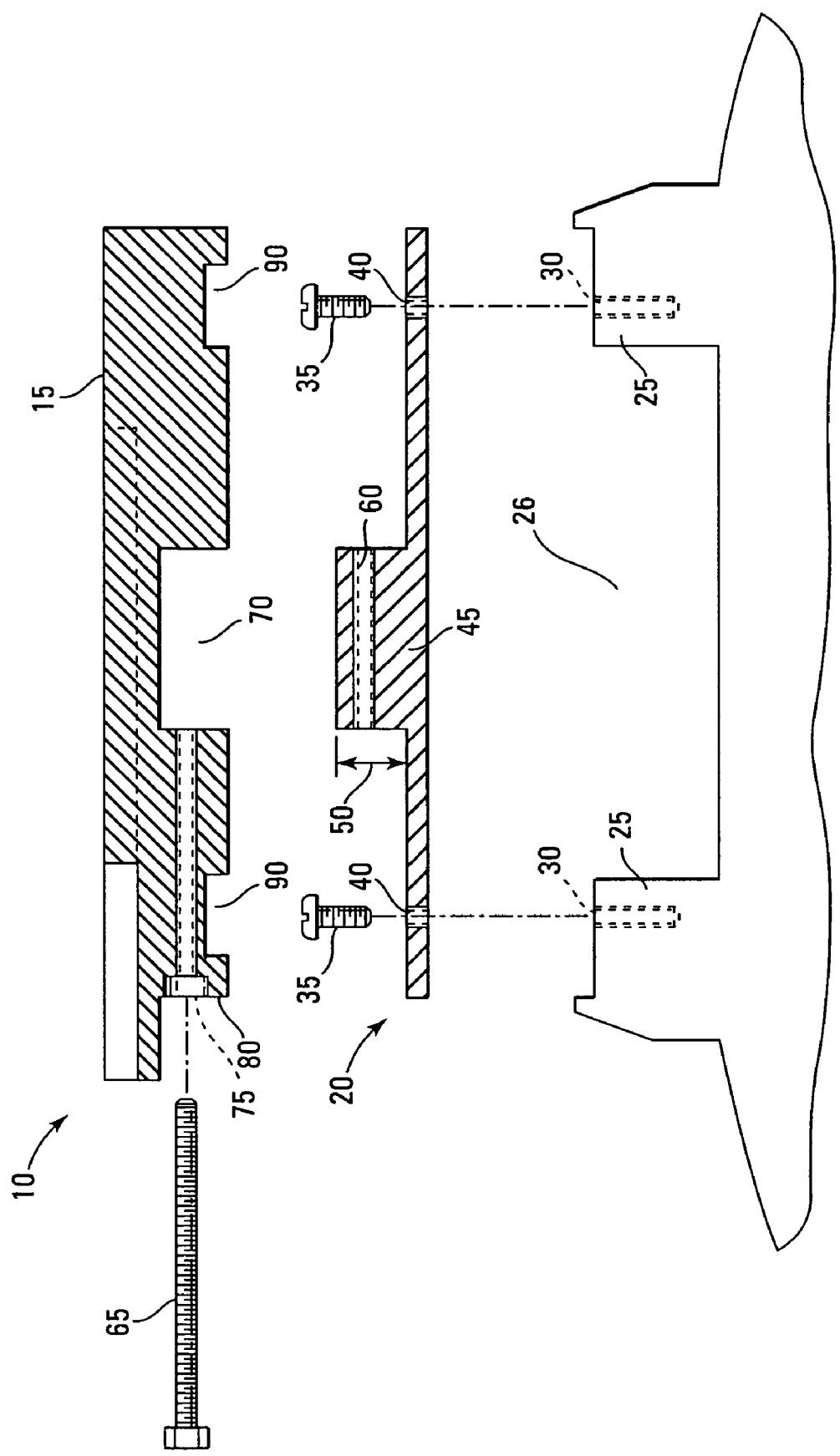
FIG. 2 is an exploded sectional view of the cover, the backing plate, and the motorcycle engine, along the line 2-2 in FIG. 1, in accordance with the present invention.

FIG. 2 is a sectional view of the cover 10, a backing plate 20, and a motorcycle engine 25. As shown in FIG. 2, the motorcycle engine 25 defines an opening 26 and includes at least one threaded aperture 30, located near the periphery of the opening 26, adapted for the insertion of fastener 35. Additional apertures can be present as needed. In the embodiment shown in FIG. 2, two threaded apertures 30 are shown, as are two fasteners 35. In exemplary embodiments, the opening 26 is an ignition timing component opening or a clutch inspection opening. In other embodiments, the opening 26 is any other opening typically or occasionally closed by a removable protective cover. In yet another embodiment, the cover is attached to the engine 25 at a point that does not cover an opening 26.

The backing plate 20 includes at least one aperture 40 adapted for insertion of a fastener 35. In this embodiment, two apertures 40 are shown. At least one fastener 35 is used to attach the backing plate 20 to the motorcycle engine 25. In one embodiment, five fasteners 35 are used to attach the backing plate 20 to the motorcycle engine 25. In one embodiment, the backing plate 20 has a diameter of between about 1 and about 10 inches. In one embodiment, the backing plate 20 has a diameter of between about 2 and 4 inches. In one embodiment, the diameter of the backing plate 20 is about 8 inches.

As further shown in FIG. 2, the backing plate 20 also includes a protrusion or post 45, which has a height 50 that is sufficient to allow for a threaded aperture 60, adapted for the insertion of a fastener 65. The fastener 65 may be an externally-threaded bolt. In one embodiment, the post 45 has a square cross-section and is adapted to mate with a cavity 70 in the bottom surface of the base 17. In this embodiment, the square post 45 mates with a square cavity 70 the bottom of the base 17, which acts to prevent rotation of the timing cover 10 with respect to the backing plate 20. In another embodiment, the post 45 is generally round with a flat. In this embodiment, the base 17 would have a corresponding D-shaped cavity 70 adapted to accept the post. In other embodiments, the post has other shapes known in the art for allowing coupling of the base 17 to the backing plate 20.

As shown in FIG. 2, a threaded aperture 75 is formed into a side 80 of the base 17. The aperture 75 is adapted so that the fastener 65 (not shown to scale) can be inserted through the aperture 75 extending through the base 17 and into the threaded aperture 60 located in the post 45, thereby attaching the cover 10 to the backing plate 20. As discussed above, the backing plate 20 is, in turn, coupled to the motorcycle engine 25. The bottom surface of the base 17 further includes indentations 90 generally shaped to accept the heads of the fasteners 35, which connect the backing plate 20 to the engine 25. In the embodiments including a generally round post with a flat surface, the post may or may not include an aperture to accept the fastener. In one embodiment, the fastener is driven tightly against the surface of the flat to secure the base 17 to the backing plate 20.

Although only one fastener 65 is shown in the present embodiment, it is within the contemplation of the invention that additional fasteners could be used in various positions on cover 15. Furthermore, any other design of cover 15 that allows for the attachment of cover 15 to backing plate 20 in a similar manner could be used.

Figure 3:
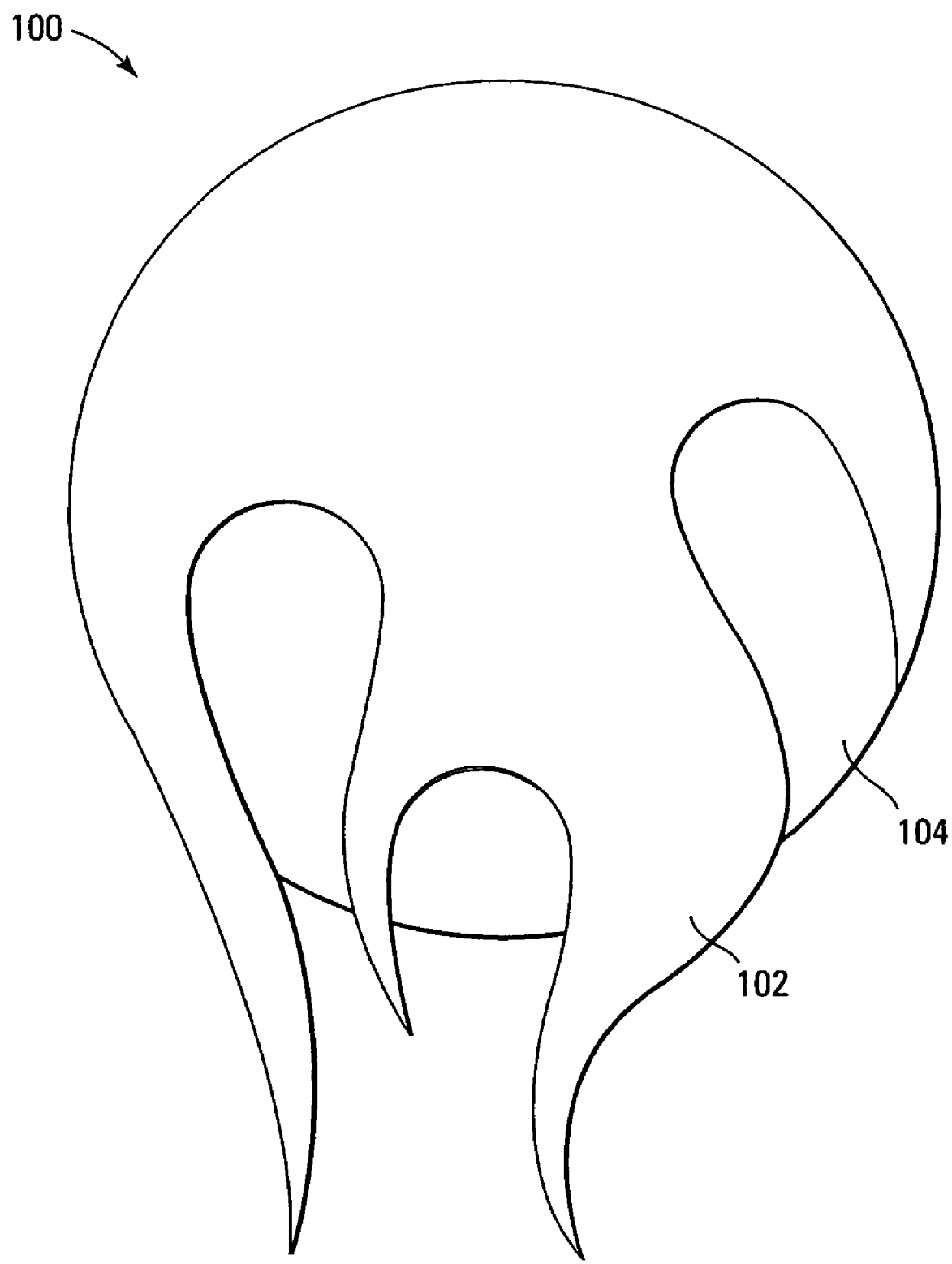
FIG. 3 is a top view of a cover according to another embodiment of the present invention.

FIG. 3 shows a top view of a cover 100 in accordance with another embodiment of the present invention. As shown in FIG. 3, the cover 100 includes a design or pattern 102 covering a base 104.

Various modifications and additions can be made to the exemplary embodiments discussed without departing from the scope of the present invention. Accordingly, the scope of the present invention is intended to embrace all such alternative, modifications, and variations as fall within the scope of the claims, together with all equivalents thereof.

I claim:

1. A motorcycle engine cover system comprising:
    a backing plate adapted for coupling to a motorcycle engine, the backing plate having a protrusion defining a first aperture to accept a fastener;
    a cover defining a cavity that is shaped to mate with the protrusion and a second aperture extending from a side surface into the cavity; and
    at least one fastener extending through the second aperture and into the first aperture for securing the cover to the backing plate.

2. The system of claim 1 wherein the cover includes a raised pattern.

3. The system of claim 2 wherein the pattern is a flame configuration.

4. The system of claim 1 wherein the cover has a standard design diameter of from about 1 to about 10 inches.

5. The system of claim 1 wherein the standard design diameter is about 8 inches.

6. The system of claim 1 wherein the backing plate has at least one fastening aperture adapted to accept a second fastener for coupling the backing plate to a motorcycle engine.

7. The system of claim 6 wherein a bottom surface of the cover includes at least one indentation for accepting a head of the second fastener.

8. The system of claim 1 further comprising a motorcycle engine defining an opening and wherein the backing plate is adapted to generally enclose the opening.

9. The system of claim 8 wherein the opening is an ignition timing component opening.

10. The system of claim 1 wherein the protrusion has a generally rectangular cross-section.

11. A motorcycle engine cover system for enclosing an opening defined by a motorcycle engine, the system comprising:
    a backing plate defining at least one fastening aperture positioned to align with a corresponding aperture in the motorcycle engine, the backing plate having a protrusion defining a first aperture to accept a fastener;
    a first fastener extending through the fastening aperture and into the corresponding aperture in the motorcycle engine;
    a cover defining a cavity that is shaped to mate with the protrusion and a second aperture extending from a side surface into the cavity; and
    a second fastener extending through the second aperture and into the first aperture for securing the cover to the backing plate.

12. The system of claim 11 wherein the protrusion has a generally rectangular cross-section.

13. The system of claim 11 wherein the protrusion has a generally circular cross-section with a flat segment.

14. The system of claim 11 wherein the opening is an ignition timing component opening.

15. The system of claim 11 wherein the opening is a clutch inspection opening.

16. The system of claim 11 wherein the cover includes a base and a pattern.

17. The system of claim 16 wherein the base has a diameter of from about 1 to about 10 inches.

18. The system of claim 17 wherein the base diameter is about 8 inches.

19. The system of claim 17 wherein the base diameter is about 3 inches.

* * * * *